(12) United States Patent
Stevens et al.

(10) Patent No.: US 8,091,445 B1
(45) Date of Patent: Jan. 10, 2012

(54) OFFSET COMPOUND GEAR INLINE TWO-SPEED DRIVE

(75) Inventors: Mark A. Stevens, Broadview Heights, OH (US); Robert F. Handschuh, North Olmsted, OH (US); David G. Lewicki, Avon, OH (US)

(73) Assignee: The United States of America as represented by the Administrator of National Aeronautics and Space Administration, Washington, DC (US)

( * ) Notice: Subject to any disclaimer, the term of this patent is extended or adjusted under 35 U.S.C. 154(b) by 455 days.

(21) Appl. No.: 12/431,456

(22) Filed: Apr. 28, 2009

(51) Int. Cl.
*F16H 3/04* (2006.01)
(52) U.S. Cl. .......................................... 74/332
(58) Field of Classification Search .................. None
See application file for complete search history.

(56) References Cited

U.S. PATENT DOCUMENTS

| | | | | |
|---|---|---|---|---|
| 1,872,338 | A | * | 8/1932 | Plexico ........................... 74/332 |
| 1,912,936 | A | * | 6/1933 | Fawick ........................... 74/332 |
| 1,966,874 | A | * | 7/1934 | Thompson ...................... 74/332 |
| 1,975,300 | A | * | 10/1934 | Thompson ...................... 74/332 |
| 2,998,729 | A | * | 9/1961 | Warsaw .......................... 74/7 R |
| 3,053,326 | A | | 9/1962 | Derschmidt |
| 5,178,028 | A | | 1/1993 | Bossler, Jr. |
| 6,612,195 | B2 | | 9/2003 | Gmirya et al. |
| 6,641,365 | B2 | | 11/2003 | Karem |
| 7,044,877 | B2 | | 5/2006 | Ai |
| 2007/0205321 | A1 | | 9/2007 | Waide |

OTHER PUBLICATIONS

Mark A. Stevens, Robert F. Handschuh, David G. Lewicki; Concepts for Variable/Multi-Speed Rotorcraft Drive System; American Helicopter Society 64th Annual Forum; Montreal, Canada; Apr. 29-May 1, 2008.

* cited by examiner

*Primary Examiner* — Dirk Wright
(74) *Attorney, Agent, or Firm* — Howard M Cohn; Robert H. Earp, III

(57) ABSTRACT

A two-speed transmission having an input shaft and an output shaft, the transmission being capable of transitioning between fixed ratios, the high-range ratio being direct 1:1 and the low-range ratio being about 2:1. The transmission is a simple lightweight, yet robust, configuration utilizing only two gear meshes, being comprised of an input gear, a cluster gear, and an output gear. The transmission is controlled with a clutch and a sprag and with the input and output shafts turning in the same direction.

21 Claims, 5 Drawing Sheets

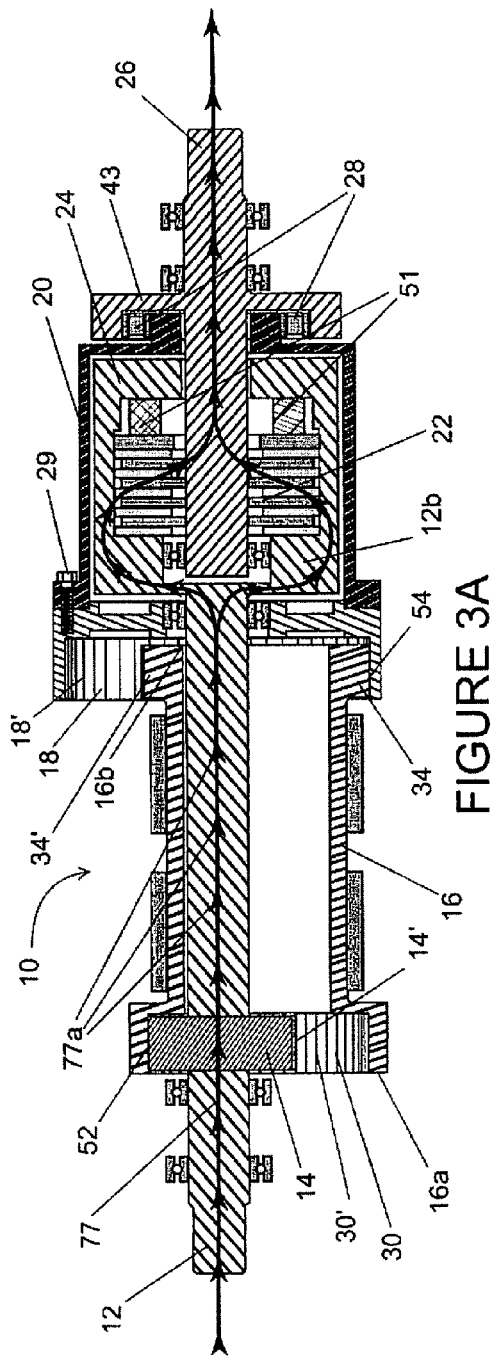
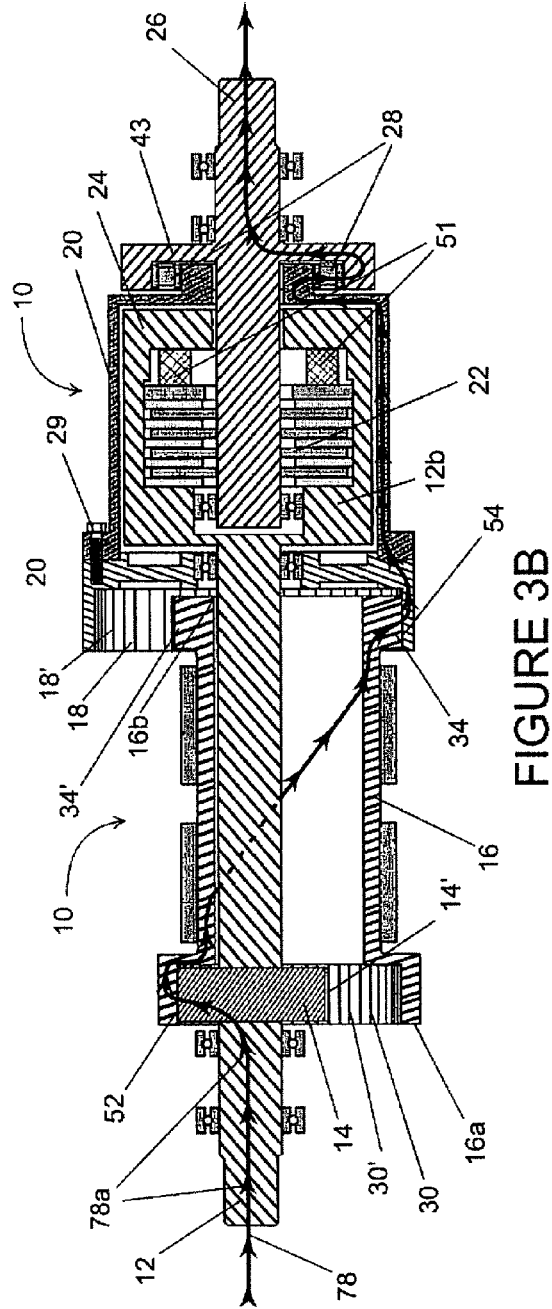

OFFSET COMPOUND GEAR INLINE TWO-SPEED DRIVE

STATEMENT REGARDING FEDERALLY SPONSORED RESEARCH OR DEVELOPMENT

The invention described herein was made by an employee of the United States Government and may be manufactured and used by or for the Government for Government purposes without the payment of any royalties thereon or therefore.

TECHNICAL FIELD

The invention relates to transmissions, and more particularly to a device(s) and configurations which provide a simple, lightweight two-speed drive which can be used either as an overall transmission or as a supplemental add-on input transmission (e.g., over-drive/under-drive) to extend the capability of an existing transmission.

BACKGROUND

In several recent studies and on-going developments for advanced rotorcraft, the need for variable or multi-speed capable rotors has been raised. A speed change of up to 50% has been proposed for future rotorcraft to improve overall vehicle performance. Accomplishing rotor speed changes during operation requires both a rotor that can perform effectively over the operational speed-load range, and a propulsion system that can enable these speed changes.

Rotorcraft propulsion is a critical element of the overall rotorcraft. Unlike fixed wing aircraft, the rotor propulsion system provides lift and control as well as forward thrust. As a result, the rotorcraft engine-gearbox system must be highly reliable and efficient. In addition, the gearbox system must be kept at minimum weight. Presently, the propulsion system accounts for up to 25% of empty vehicle weight. The drive system accounts for up to 72% of the total propulsion system weight. Future rotorcraft trends call for more versatile, efficient, and powerful aircraft, all of which challenge state-of-the-art propulsion system technologies. Variable speed rotors have been identified as having a large impact on many critical rotorcraft issues.

Currently, rotor speed can only be varied a small percentage by adjusting the speed of the engine. The variation in rotor speed is generally limited by engine efficiency and stall margin, permitting speed changes limited to approximately 15% when used in current tilt-rotor applications.

There is a need for a transmission with a high-range ratio (1:1) for hover mode operation and low-range reduction ratio, such as for example 50% (2:1), through a speed change mechanism, for cruise mode operation. A transmission of this type could be incorporated as an element within the overall propulsion system resulting in overall ratios of 50:1 to 100:1 in the aircraft.

It is commonly recognized that variable speed propulsion is required for the design of future advanced rotorcraft. Reductions in rotor speed are required to limit the advancing rotor tip speed and reduce rotor noise.

RELATED PATENTS

The following patents are incorporated by reference in their entirety herein.

U.S. Pat. No. 7,044,877 to Ai discloses for example a two speed transmission having an input shaft and an output shaft. The two-speed transmission is capable of changing the rotating speed of the output shaft from a first speed ratio to a second speed ratio. The shift between the first rotating speed ratio and the second rotating speed ratio is smoothly accomplished by the combination of two sets of planetary gear clusters and two electric motors. The electric motors being are to smooth the mechanical shift between the first speed ratio and the second speed ratio. However, Ai does not disclose a transmission with a high-range ratio (1:1) and low-range reduction ratio, such as for example 50% (2:1), which changes from one to the other through a speed change mechanism including gears, a clutch and a sprag.

U.S. Pat. No. 6,641,365 to Karem disclosed for example "A variable speed helicopter tilt rotor system and method for operating such a system are provided which allow the helicopter rotor to be operated at an optimal angular velocity in revolutions per minute (RPM) minimizing the power required to turn the rotor thereby resulting in helicopter performance efficiency improvements, reduction in noise, and improvements in rotor, helicopter transmission and engine life."

US Patent Application No. 2007/0205321 to Waide discloses for example gearboxes providing first and second power-balanced paths in which a speed changer is configured to operate with only one path. Most preferably, the gearbox includes a friction clutch and a sprag clutch arranged such that, together with a lay-shaft and spur-gear differential, gear shifting can be done while transmitting power. The speed changing gearbox of the '321 application has first and second independently and concurrently operational drive paths for transmission of torque. However, Waide does not disclose a transmission with a high-range ratio (1:1) and low-range reduction ratio, such as for example 50% (2:1), which changes from one to the other and directs the torque through an output shaft which is in the same drive path as the input shaft.

SUMMARY OF THE INVENTION

With the present invention, a transmission, preferably for a rotorcraft is provided where the rotation of the rotor blades can be at 50% or less while maintaining engine speed at the optimal efficiency/performance speed. A portion of the overall 50% reduction can come from extending the engine speed operability range beyond present 15% decrease with the balance provided by the transmission of the present invention. At the present time, the reduction in rotor speed of about 15% is presently accomplished by changing the engine speed. However, with the transmission of the present invention, the entire 50% decrease in rotational speed can be realized without requiring any additional reduction in the speed of the engine. Future overall propulsion system (engine, driveline, and rotor) studies will determine what portion the transmission device should provide for overall optimal performance. This invention uniquely provides both a high-speed 1:1 range and a low-speed 2:1 range (50% speed reduction) with minimal robust parts. The low range ratio being dependent upon the gearing contained within can be varied, as required, to meet specific requirements.

According to the present invention, there is disclosed a transmission having a gear arrangement for transmitting torque from an input shaft to an output shaft. The input shaft rotates about a first rotational axis and has a first gear coupled thereto. An elongated, hollow, cylindrical shaft rotates about a second rotational axis that is offset from the first rotational axis. The hollow cylindrical shaft has a second gear at one end there of which meshes with the first gear and a third ring gear at an opposite end thereof. A fourth gear is mounted to one end of a hollow drive shaft. The fourth gear and the hollow drive shaft rotate about the first rotational axis. The fourth gear is meshed with the third gear of the hollow, cylindrical shaft. The hollow drive shaft has a cylindrical end portion at an opposite end thereof. The output shaft rotates about the first rotational axis and has a flange portion attached thereto. A sprag clutch has an input side mounted to the cylindrical end portion of the hollow drive shaft and an output side mounted to the flange portion of the output shaft. A multi-plate clutch is attached to an end portion of input shaft and to the output shaft. Coupling structure is provided for coupling the input shaft with the output shaft whereby the transmission operates in first and second modes.

Further according to the present invention, the first mode of operation results in a rotating speed ratio $R_1$ of 1 to 1 between the input shaft and the output shaft and the second mode of operation results in the rotating speed reduction ratio range of $4.00 > R_2 > 1.50$ between the input shaft and the output shaft. Preferably, the second mode of operation results in the rotating speed reduction ratio range of 2 to 1 between the input shaft and the output shaft.

Still further according to the present invention, coupling structure for coupling the input shaft with the output shaft can cause the rotational speed of the output shaft to be the same as the rotational speed of the input shaft is the multi-plate clutch.

Yet further according to the present invention, the clutch is a multi-plate clutch having first spaced clutch plates driven by an end portion of the input shaft and second spaced clutch plates which drive the output shaft and interspersed between the first spaced clutch plates.

Moreover, according to the present invention, a clutch actuator means engages or disengages the first and second interspersed clutch plates whereby if the multi-plate clutch is engaged the rotational speed of the output shaft is at a first speed which is the same as that of the input shaft and if the clutch is disengaged the rotational speed of the output shaft is at a speed that is different from that of the input shaft.

Also, according to the present invention, the multi-plate clutch causes the rotational speed of the output shaft to be the same as the rotational speed of the input shaft whereby the transmission operates in first mode (high speed range, 1:1 ratio).

Also, according to the present invention, the sprag clutch causes the rotational speed of the output shaft to be less than the rotational speed of the input shaft whereby the transmission operates in second mode (low speed range, 2:1 ratio).

According to the present invention, the first gear has external teeth adapted to mesh with the internal teeth of the second gear and third gear has external teeth adapted to mesh with the internal teeth of fourth gear.

Further according to the present invention, the relationship between the output rotational speed and the input rotational speed for the second mode of operation is given by the equation $$\text{Output speed} = \text{Input speed} \times \left(\frac{N_{14}}{N_{30}}\right) \times \left(\frac{N_{34}}{N_{18}}\right)$$

where $N_{14}$ is equal to the number of teeth on first gear, $N_{30}$ is equal to the number of teeth on the second gear, $N_{34}$ is equal to the number of teeth on the third gear, and $N_{18}$ is equal to the number of teeth on the fourth gear.

Still further according to the present invention, the input shaft is driven by a device from which it receives rotational power such as an engine or an intermediate drive coupling if the present invention is added to an existing design engine-transmission driveline and used as a supplemental inline speed change device.

Yet further according to the present invention, the first input shaft of the transmission is connected to the output shaft of a second gear arrangement for transmitting torque from a second input shaft to the first input shaft. The second gear arrangement comprises a second input shaft rotating about the first rotational axis and having a first gear coupled thereto. An elongated, hollow, cylindrical shaft rotating about the second rotational axis is offset from the first rotational axis. The hollow cylindrical shaft having a second gear at one end thereof which engages the first gear and a third gear at an opposite end thereof. A fourth gear is supported by a bearing at the aft end of the input shaft of the transmission.

Still further according to the present invention, the relationship between the output speed and input for low speed operation of the second gear arrangement is given by the equation:

$$\text{Output Speed} = \text{Input Speed} \times (N_{414}/N_{430}) \times (N_{434}/N_{418})$$

where $N_{14}$ is equal to the number of teeth on first gear (414), $N_{30}$ is equal to the number of teeth on the second gear (430), $N_{34}$ is equal to the number on the third gear (434), and $N_{18}$ is equal to the number of teeth on the fourth gear (418).

Yet further according to the present invention, the transmission is a rotorcraft transmission of a light weight configuration with reduced parts.

According to the present invention, there is disclosed a method of transmitting torque from an input shaft to an output shaft of a transmission. The method includes the steps of rotating the input shaft having a first gear coupled thereto about a first rotational axis; rotating an elongated, hollow, cylindrical shaft about a second rotational axis that is offset from the first rotational axis, the hollow cylindrical shaft having a second gear at one end thereof which engages the first gear and a third gear at an opposite end thereof; rotating a fourth gear mounted to one end of a hollow drive shaft with a cylindrical end portion at an opposite end thereof about the first rotational axis whereby the fourth gear engages the third gear of the hollow, cylindrical shaft; rotating the output shaft with a flange portion attached thereto about the first rotational axis; mounting an input side of a sprag clutch to the cylindrical end portion of the hollow drive shaft and an output side of the sprag clutch to the flange portion of the output shaft; and coupling the input shaft with the output shaft whereby the transmission (10) operates in first or second modes.

Further according to the present invention, there is disclosed the steps of operating in the first mode of operation resulting in a rotating speed ratio $R_1$ of 1 to 1 between the input shaft and the output shaft; and operating in the second mode of operation resulting in the rotating speed ratio $R_2$ of and the second mode of operation results in the rotating speed reduction ratio range of $4.00 > R_2 > 1.50$ between the input shaft and the output shaft.

Still further according to the present invention, means are provided for attaching first spaced clutch plates of a multi-plate clutch to an end portion of input shaft and attaching second spaced clutch plates to the output shaft whereby the second clutch plates are interspersed between the first spaced clutch plates; and engaging the first and second interspersed clutch plates whereby the rotational speed of the output shaft is the same as that of the input shaft or disengaging the first and second interspersed clutch plates whereby the rotational speed of the output shaft is less than that of the input shaft.

Also according to the present invention, there is disclosed a method of transferring torque from an input shaft to an output shaft of a transmission including the steps of operating in the first mode of operation resulting in a rotating speed ratio $R_1$ of 1 to 1 between the input shaft and the output shaft; and operating in the second mode of operation resulting in the rotating speed ratio $R_2$ of 2 to 1 between the input shaft and the output shaft.

Further according to the present invention, there is disclosed a method of transferring torque from an input shaft to an output shaft of a transmission including the step of engaging or disengaging the multi-plate clutch whereby when the multi-plate clutch is engaged the rotational speed of the output shaft is at a first speed which is the same as that of the input shaft and when the multi-plate clutch is disengaged the rotational speed of the output shaft is at a speed that is less than that of the input shaft.

Also according to the present invention, there is disclosed the steps of engaging or disengaging the clutch whereby when the clutch is engaged the rotational speed of the output shaft is at a first speed which is the same as that of the input shaft and when the clutch is disengaged the rotational speed of the output shaft is at a speed that is less than that of the input shaft.

Still further according to the present invention, there is disclosed the steps of coupling the input shaft with the output shaft to cause the transmission to operate in the first mode with the rotational speed of the output shaft the same as the rotational speed of the input shaft is with the multi-plate clutch.

Still further according to the present invention, there is disclosed the steps of coupling the input shaft with the output shaft to cause the transmission to operate in the second mode with the rotational speed of the output shaft less than the rotational speed of the input shaft is with the sprag clutch where the output speed is governed by the overall ratio of the gear set comprised of the first, second, third and fourth gears.

Yet further according to the present invention, there is disclosed the step of connecting the input shaft to a device that transmits rotational power.

Further according to the present invention, there is disclosed the step of serially connecting a plurality of gear arrangements and determining the overall output ratio of the two serially connected gear arrangements from the product of the two in-series ratios, $R_1$, $R_2$.

BRIEF DESCRIPTION OF THE DRAWINGS

Reference will be made in detail to embodiments of the disclosure, examples of which may be illustrated in the accompanying drawing figures (FIGs). The figures are intended to be illustrative, not limiting. Although the invention is generally described in the context of these embodiments, it should be understood that it is not intended to limit the invention to these particular embodiments.

Certain elements in selected ones of the figures may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity. In some cases, hidden lines may be drawn as dashed lines (this is conventional), but in other cases they may be drawn as solid lines.

Figure 1:
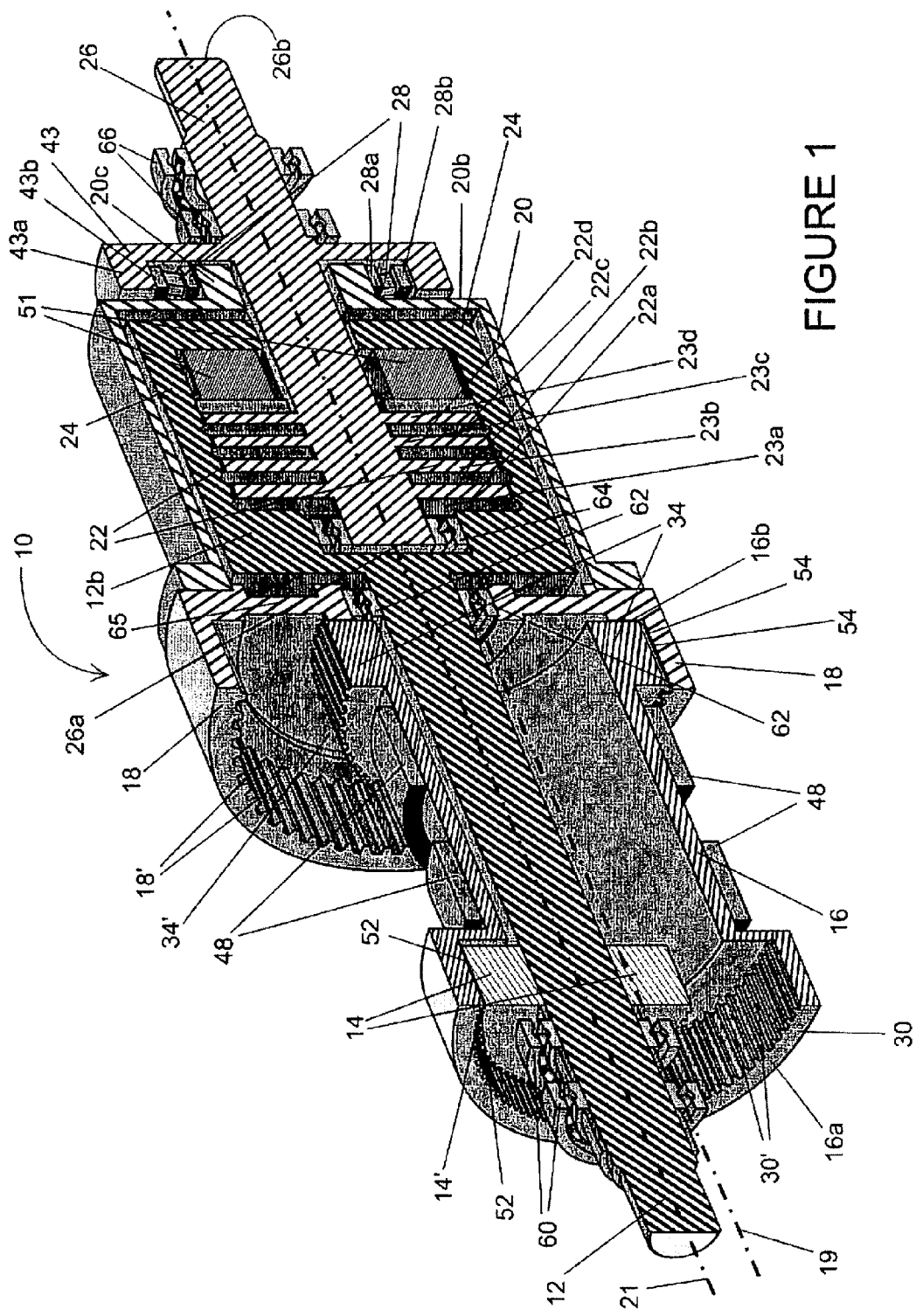

If shading or cross-hatching is used, it is not intended to be of use in distinguishing one element from another (such as a cross-hatched element from a neighboring un-shaded element). It should be understood that it is not intended to limit the disclosure due to shading or cross-hatching in the drawing figures.

FIG. 1 is an oblique cross sectional view of a two-speed, mechanical-power-conveying transmission, according to the present invention.

Figure 2A:
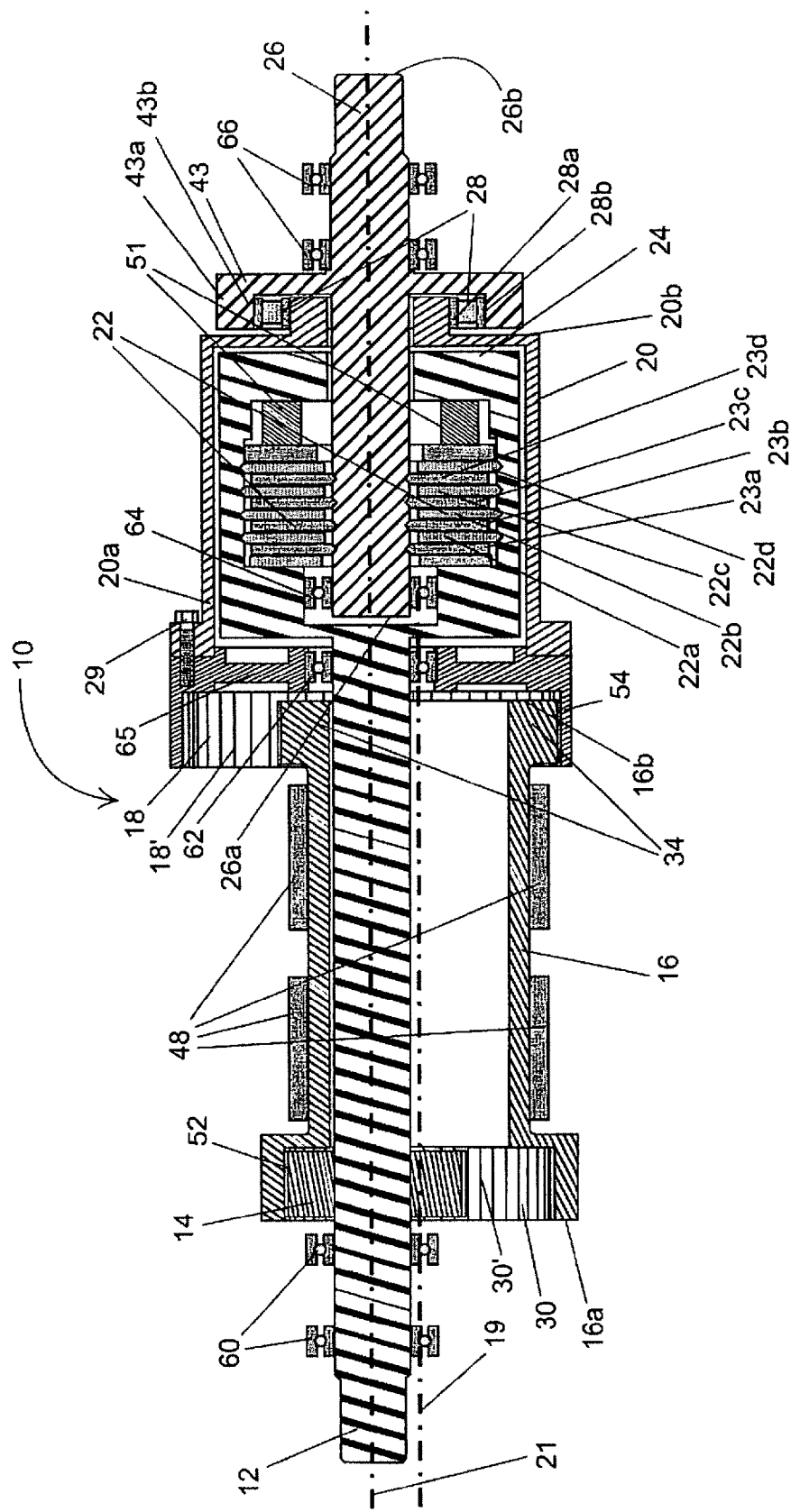

FIG. 2A is an orthogonal cross sectional view of the two-speed, mechanical-power-conveying transmission, according to the present invention.

Figure 2B:
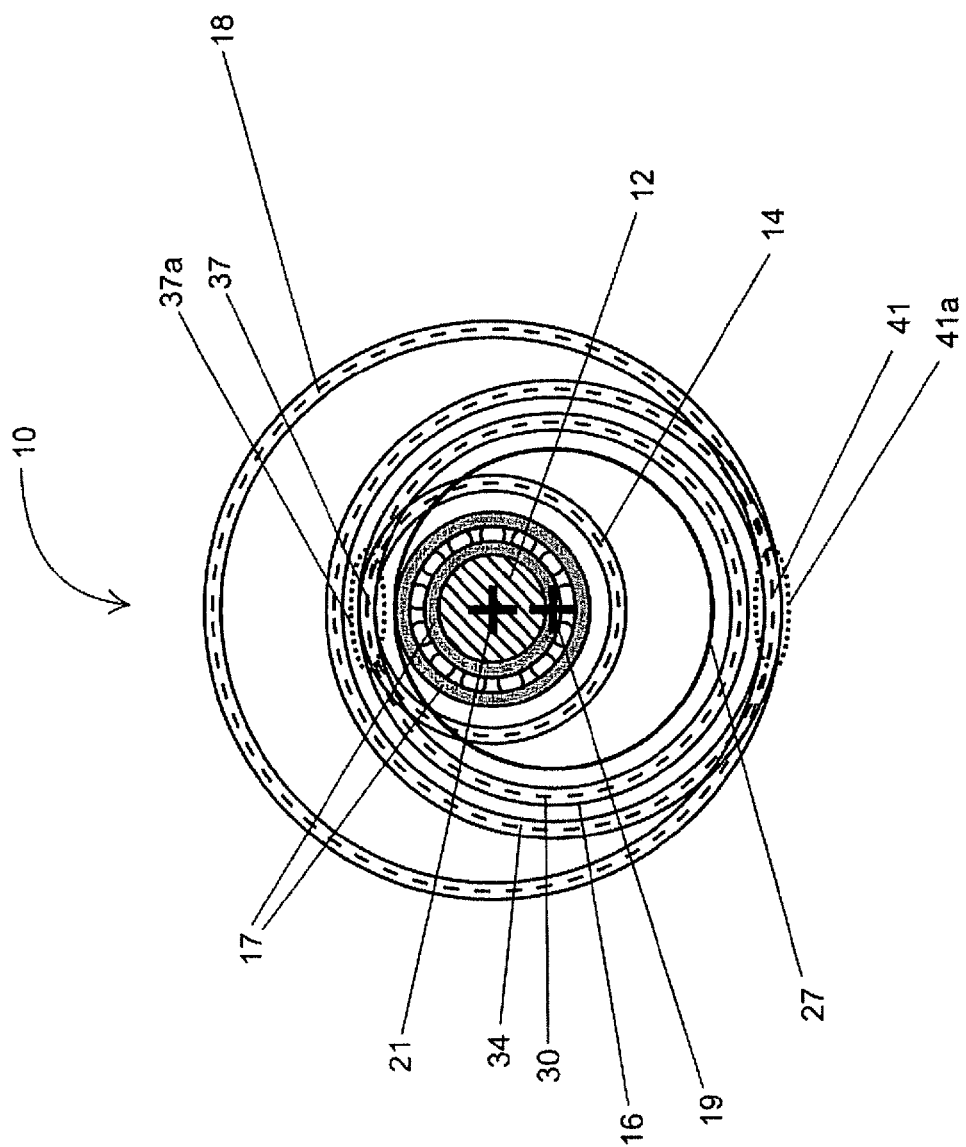

FIG. 2B is a schematic axial view of the gear relationships in the two-speed, mechanical-power-conveying transmission, in according to the present invention.

FIG. 3A is an orthogonal cross sectional view of the present invention showing the path of power flow during high-speed output operation of the two-speed, mechanical-power-conveying transmission, according to the present invention.

FIG. 3B is an orthogonal cross sectional view of the present invention showing the path of power flow during low-speed output operation of the two-speed, mechanical-power-conveying transmission, according to the present invention.

Figure 4:
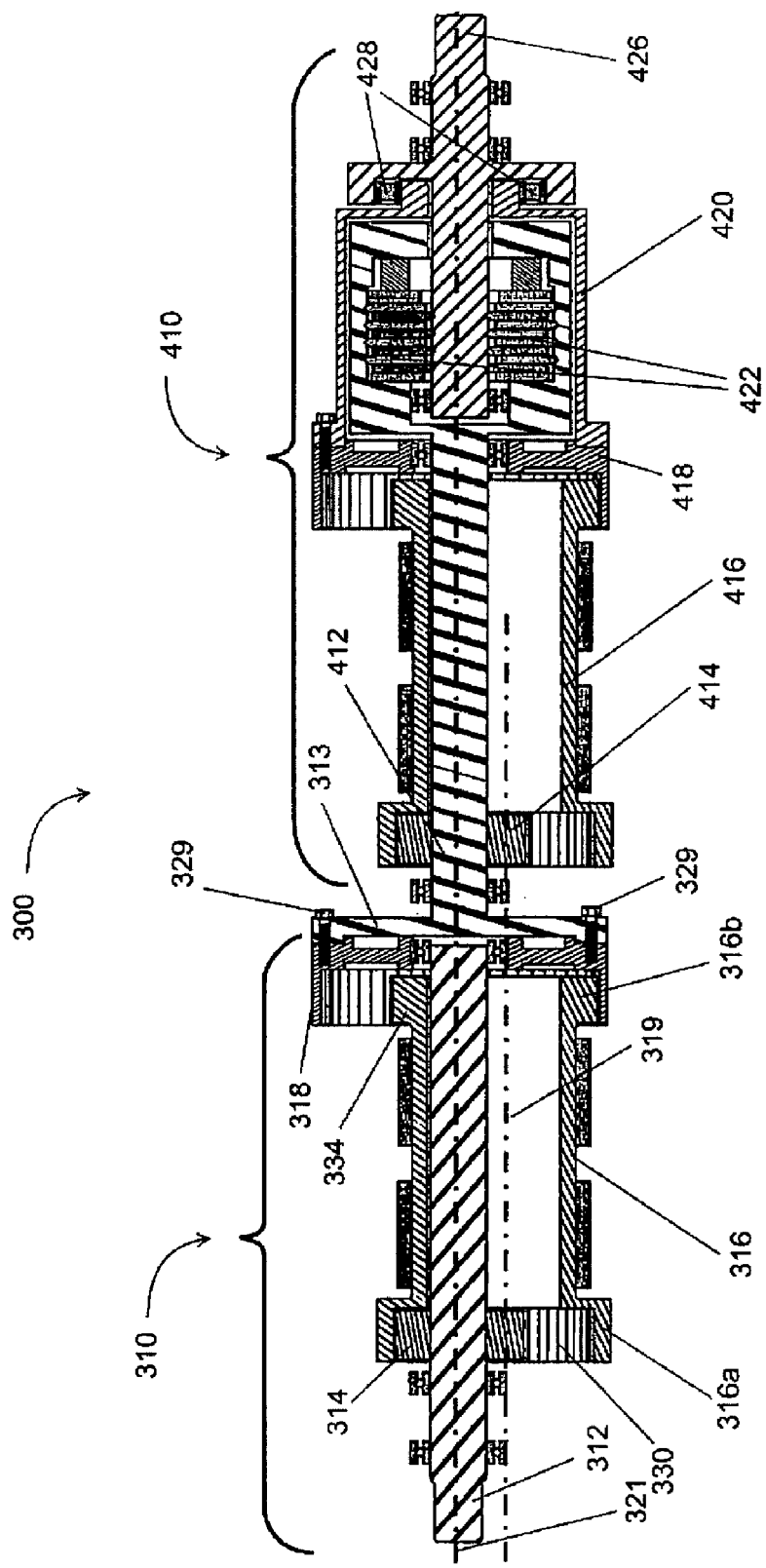

FIG. 4 is an orthogonal cross sectional view of multiple stages of the two-speed, mechanical-power-conveying transmission in series, according to the present invention.

DETAILED DESCRIPTION OF THE INVENTION

Throughout the descriptions set forth herein, various features of the invention may be described in the context of a single embodiment. The features, however, may also be provided separately or in any suitable combination. Conversely, although the invention may be described herein in the context of separate embodiments for clarity, the invention may also be implemented in a single embodiment. Furthermore, it should be understood that the invention can be carried out or practiced in various ways, and that the invention can be implemented in embodiments other than the exemplary ones described hereinbelow. The descriptions, examples, methods and materials presented in the description, as well as the claims, should not be construed as limiting, but rather as illustrative.

If any dimensions are set forth herein, they should be construed in the context of providing some scale to the relationship between the elements. For example, a given element may have an equal, lesser or greater dimension (such as diameter) than another element. Any dimensions that are important or critical will generally be identified as such. The term "at least" includes equal to or greater than. The term "up to" includes less than. Also, an open-ended range or ratio as "at least 2:1" should be interpreted to include sub-ranges such as at least 2:1, at least 5:1, and at least 10:1.

The present two-speed transmission invention 10 is referred to herein as a "transmission," "two-speed transmission," "compound gear transmission," or variations thereof, or as the inventors' preferred usage: "offset compound gear drive," or OCG.

Referring to FIG. 1 there is shown in cross sectional view the novel two-speed, mechanical-power-conveying transmission 10 comprising an input shaft 12 having a first gear 14 attached thereto, an output shaft 26, an elongated, hollow, cylindrical shaft 16 having a second gear 30 possessing internal teeth at one end 16a of the cylindrical shaft, and a third gear 34 possessing external teeth at the other end 16b of the cylindrical hollow shaft, a fourth gear 18 integral with or attached to wheel 65 and supported on bearing 62 maintaining concentricity with gear 14 by means of the aft end of shaft 12, a multi-plate clutch 22, and a sprag clutch 28. The input shaft (12) is rotationally driven by a device (13), such as an engine, from which it receives rotational power. The elongated cylindrical shaft 16 has a rotational axis 19 that is offset from a shared main rotational axis 21 of the input shaft 12 and the output shaft 26. Input shaft 12 is supported on bearings 60 and 62. Output shaft 26 is supported on bearings 64 and 66. Bearings 60 and 66 serve as drive system main bearings. Bearings 62 and 64 serve as intermediate bearings. Bearing 62 maintains concentricity and permits relative differential rotational speeds between gear 18 and shaft 12. Bearing 64 serves as a pilot bearing between input shaft 12 and output shaft 26 to maintain concentricity and permit relative differential rotational motion between input shaft 12 and output shaft 26 (i.e., differential rotational speeds). Bearings 60, 62, 64, and 66 share a common central axis 21. Shaft 16 is supported on bearings 48 which are concentric with the axis 19 and are offset from the central axis 21 of bearings 60, 62, 64, and 66. The offset between the axis 19 and 21 is a direct function of the gear ratios. Bearings 60, 62, 64, and 66 are represented as rolling element type bearings but may also be of the fluid film type or magnetic type as warranted by overall transmission speed and power requirements, and bearings 48 which are represented as fluid film type journals may also be of the rolling element type.

The first gear 14 having external teeth, is affixed to the input shaft 12, and meshes with the second gear 30 having internal teeth, on the forward end 16a of the elongated hollow shaft 16. At the aft end 16b of the elongated hollow shaft 16 is a third gear 34, having external teeth, and which meshes with a fourth gear 18, having internal teeth. The fourth gear 18 is attached to a hollow drive shaft 20 at a forward end 20a, by means such as bolts 29 (see FIG. 2A). The opposite or distal end 20b of hollow drive shaft 20 has a cylindrical end portion 20c onto which is mounted the input side 28a of a sprag clutch 28.

The output shaft 26 has an integral flange portion 43 that is located between opposite ends 26a and 26b of the output shaft 26. Flange portion 43 has an upstanding rim 43a with an inner surface 43b that receives the output side 28b of the sprag clutch 28. The input shaft 12 has an end portion 12b that is large in diameter as compared to the remainder of the input shaft 12.

A hollow cylinder 24, sized to accommodate the multi-plate clutch assembly 22, is attached or contiguous with the input shaft distal end portion 12b of input shaft 12. The clutch assembly 22 has alternating stacked clutch plates 22a, 22b, 22c, 22d (22a-22d) (see FIG. 2) that are driven by, and rotate at the same speed as hollow cylinder 24 by means of spline or tooth engagement at the outer perimeter. The spaced stacked plates 22a-22d engage by means of friction a set of interspersed stacked clutch plates 23a, 23b, 23c, 23d (23a-23d) which drive and rotate at the same speed as the output shaft 26 by means of spline or tooth engagement at the inner perimeter. An annularly arranged clutch actuator 51, which is mounted to and rotates with the end portion 12b of input shaft 12, compresses or releases the clutch 22 to cause it to engage or disengage during operation, as described herein below. The configuration of the clutch actuator 51 is a mechanical spring arrangement (e.g., helical coil, Belleville, diaphragm spring) activated and hydraulically released (e.g., by an annular piston). A mechanical fail safe feature is incorporated in the clutch release (disengagement) mechanism so that the clutch will be engaged if there is a failure of the clutch release mechanism. FIG. 2B provides an axial schematic view of the rotating components of the present transmission invention 10. The elements shown are the input shaft 12 (which has the output shaft 26 behind it and out of view), having the first gear 14 attached thereto, a ball or roller type bearing 17, the second gear 30 and the third gear 34 that are part of, and integral with, the offset hollow cylindrical shaft 16, and the fourth gear 18. The solid line 27 defines the foreshortened, end view of the cylindrical surface plane of bearings 48, which provide support to offset hollow shaft 16. The offset aspect of the hollow driveshaft 16 is evident in the location of its axis of rotation 19 in relation to the axis of rotation 21 that is shared by the input shaft 12 and the output shaft 26. Axis of rotation 21 is the central, or primary, machine axis on which the drive system input and output are centered, whereas axis of rotation 19 is a secondary axis of rotation on which some of the internal components between the input and output rotate, primarily hollow shaft 16, second gear 30, and third gear 34. The dashed oval 37a encompasses a first mesh plane 37 where the first gear 14 meshes with the second gear 30, and the second dotted oval 41a encompasses the second mesh plane 41 where the third gear 34 meshes with the fourth gear 18. FIG. 2B in an idealized view combining mesh plane 37 and mesh plane 41 into a single plane for presentation of the OCG Offset Compound Gear concept basis, whereas in the present invention the two mesh planes are separated axially.

A first bearing set 60 (see FIGS. 1 AND 2A) supports the input end 12a of the input shaft 12. A first single bearing 62 supports the fourth gear 18 in relation to the input shaft 12. A second single bearing 64 supports the output shaft 26 in relation to the input shaft 12. A second bearing set 66 supports the output shaft 26. The hollow, cylindrical offset shaft 16 is carried by bearings 48, which are of the fluid film journal/thrust type or rolling element bearing type based upon specific transmission requirements.

Operational Dynamics

During operation, if the multi-plate clutch 22 is engaged, then the rotational speed of the output shaft 26 is the same as that of the input shaft 12 and the power flows directly from the input shaft 12 to the output shaft 26 through the multi-plate clutch 22 by means of torque transmitted via friction created by the clamping force provided by releasing clutch actuator 51. If the clutch 22 is disengaged, then the rotational speed of the output shaft 26 is less than that of the input shaft 12 and the power flows from the fourth gear 18 to the flange portion 43 of the output shaft 26 by way of the sprag clutch 28. The ratio of the input rotational speed and the output rotational speed when the clutch 22 is disengaged is on the order of 2:1 as described or some other ratio as required.

The input/output speed ratio is a function of the effective respective diameters of the first and second meshing gears 14 and 30, respectively, and the respective diameters of the third and fourth meshing gears 34 and 18, respectively, as should be readily evident to those who are skilled in the art of transmission of rotary mechanical power. The input/output ratio is discussed in more detail hereinbelow.

The two-speed operation of the present transmission invention 10 becomes more evident upon contemplation of cross sectional views of FIGS. 3A and 3B. FIG. 3A illustrates high-speed operation of the present transmission invention 10, which takes place when the multi-plate clutch assembly 22 is engaged. The direction of flow of rotary mechanical power is shown by means of the line 77 with arrowheads 77a. The direction of flow of mechanical rotary power is from input shaft 12, hollow cylinder 24, to clutch assembly 22 and through output shaft 26, such that the output speed is the same as the input speed (the output ratio is 1:1.)

FIG. 3B illustrates low-speed operation of the present transmission invention 10, which takes place when the multi-plate clutch assembly 22 is disengaged. Power enters at the input shaft 12 and is transferred by way of the first gear 14 to the second gear 30, which is contiguous with the hollow driveshaft 16. The hollow driveshaft 16 conveys rotary power to the contiguous third gear 34, which transmits it to the fourth gear 18, which conveys it onward to the hollow drive shaft 20 that is affixed, such as by means of bolts 29, to a wheel portion 65 of the fourth gear 18. The hollow driveshaft 20 conveys power to the sprag clutch 28, which transmits it onward to the flange portion 43 of the output shaft 26, such that the output speed is less than the input speed, such as for example the output ratio is 2:1.

Input/Output Speed Ratios

The cylindrical offset shaft 16 comprises second and third gears 30 and 34, respectively, disposed respectively at opposing ends 16a and 16h of the offset hollow shaft assembly. The second gear 30 has internal gear teeth 30' and the third gear 34 has external gear teeth 34'. The second gear 30 of the cylindrical offset shaft 16 receives mechanical rotary power from the first gear 14 at the first gear mesh 52 (FIG. 2A) and then conveys the rotary mechanical power by means of the third gear 34 that meshes with the fourth gear 18 at the second gear mesh 54.

The internal gear teeth 30' of second gear 30 of the cylindrical offset shaft 16 receive rotary force from the external gear teeth 14' of the first gear 14; the external teeth 34' of the third gear 34 conveys rotary force to the internal gear teeth 18' of the fourth gear 18 which conveys rotary mechanical power to the hollow driveshaft 20. Input/output speed ratios are determined by the respective numbers of gear teeth 30', 34', 14', 18' of the two meshing gear sets, first and second gears 14, 30, respectively and third and fourth gears 34, 18, respectively.

The respective gear teeth 30', 34', 14', 18' of first and second gears 14, 30, respectively and third and fourth gears 34, 18, respectively, can be of the straight cut spur varieties or of the helically cut or other gear teeth types such as herringbone as deemed necessary for required power rating operational reliability and quiet operation.

Note that all rotating parts described hereinabove rotate in the same direction. Reductions in rotary speed take place at two locations: (1) at the first gear mesh 52 between the first gear 14 and the second gear 30 of the cylindrical offset, double-gear assembly 16 and, (2) at the second gear mesh 54 between the third gear 34 of the second gear 18.

The relationship between the output speed and input for the low speed operation is given by $$\text{Output speed} = \text{Input speed} \times \left(\frac{N_{14}}{N_{30}}\right) \times \left(\frac{N_{34}}{N_{18}}\right)$$

where $N_{14}$ is equal to the number of teeth on first gear 14, $N_{30}$ is equal to the number of teeth on second gear 30, $N_{34}$ is equal to the number of teeth on third gear 34, and $N_{18}$ is equal to the number of teeth on fourth gear 18.

The remainder of this section is a discussion on the ratio range potential of the OCG. The term "R" means the same as "ratio."

The ratio-range potential for the speed reduction between the input and the output shafts 12 and 26 of the OCG transmission 10 in a single-stage configuration is 4.00>R>1.50 (speed reduction output) and, conversely, it is 0.25<R<0.75 for a back driven, or reverse (speed increasing output) configuration. Preferably, however, the speed reduction ratio from the input to the output is 2:1 or R=2.

OCGs in Series Arrangement

Referring now to FIG. 4, there is shown, in cross-sectional schematic view, two OCGs 310, 410 coupled in such a way that the output of a first OCG 310 is directed into a second OCG 410 so as to provide a series arrangement 300 wherein the overall ratio of input/output speed reduction (or multiplication) can be greater than that of a single OCG. It is possible, as those skilled in the art would clearly appreciate, that an unlimited number of OCGs could be so serially arranged, though practical considerations would necessarily place limits.

The series arrangement 300, portrayed in FIG. 4, includes the first OCG 310 which is comprised of the gear portion only of the transmission 10 described hereinabove. The first OCG 310 has an input shaft 312 and three moving parts with gears such that the input shaft drives a fifth gear 314, a hollow driveshaft 316, and an eight gear 318, which correspond respectively to the first gear 14, the hollow driveshaft 16 and the fourth gear 18 in the above described OCG transmission 10. The operational dynamics of the OCG gear train 310 need not be described again, as it is the same as that given hereinabove in relation to the basic OCG transmission 10.

First OCG 310, as shown in FIG. 4, has an output shaft formed of a flange 313 which is secured to the eighth gear 318 by means such as screws 329. The output shaft 413 is shown as being contiguous with, and/or is one in the same as, the input shaft 412 of the second OCG portion 410. The other parts of the second OCG portion 410, and their operational dynamics, are as described hereinabove in reference to the OCG transmission 10. It should be noted that the method of bolting the output shaft 313 to eighth gear 318 is only one of many such coupling methods that could be used to greater or lesser advantage in the series coupling of the present OCG series arrangement 300. Splined connections could be used, or other types of bolted couplings, including flexible or universal joints could also be used, as called for by competent engineering judgment.

The second OCG portion 410 consists of the input shaft 412, a fifth gear 414 (compare first gear 14), a hollow driveshaft 416, an eight gear 418 (compare fourth gear 14), a hollow driveshaft 420 housing a clutch 422, a sprag clutch 428, and an output shaft 426, each of which, with the exception of the input shaft having the flange 413 has corresponding parts as described hereinabove in reference to the OCG transmission 10. That is to say, the second OCG transmission portion 410 displayed in FIG. 4 is of the same physical and operational sort that is described hereinabove as the transmission invention 10.

In operation, the overall series arrangement 300 provides an overall rotational speed reduction between the input shaft 312 and the output shaft 426 that is the multiplicative product of the speed reduction ratio of the first OCG portion 310 and the speed reduction ratio of the second OCG portion 410. Thus the input/output speed reduction ratio exceeds that of a single OCG transmission 10. Note also that said speed reduction property could, upon reverse driving, provide a speed multiplication, as should be obvious to those who are skilled in the art.

In the embodiment shown in FIG. 4, ratios above 4.00 can be configured using multiple stages of the transmission 10 in series. As an example, the OCG ratio range potential for the OCG Drive 10 in a two-stage configuration can provide R=16.00 by employing two R=4.00 (as the single stage limit) in series (i.e., 16=4×4). Ratios between 4 and 16 can be created using a combination of twin ratios or dual ratios in series. A series arranged dual-ratio, two-stage configuration would employ configurations with two different OCG ratios to provide the desired overall output ratio. The overall ratio is defined as the product of the two in-series ratios, $R_1$, $R_2$ (i.e., $R_{out}=R_1 \times R_2$). The subject of two-stage configurations does not imply the use of two duplicate configurations, each with a clutch and sprag. More properly, it means that the OCG gearing would be employed in a two-stage configuration while maintaining the single clutch and sprag.

For a speed reduction of the sort the OCG was designed for, the upper and lower ratio limits are restricted by the geometrically possible input gear size. Above R=4.00, the input gear becomes impractically small because the bearing size and shaft become impossibly small. Below R=1.50, the input gear becomes too large creating gear tooth interference with the internal teeth of the second mesh.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A transmission having a gear arrangement for transmitting torque from an input shaft to an output shaft, the gear arrangement comprising:
   the input shaft rotating about a first rotational axis and having a first gear coupled thereto;
   an elongated, hollow, cylindrical shaft rotating about a second rotational axis that is offset from the first rotational axis, the hollow cylindrical shaft having a second gear at one end thereof which engages the first gear and a third gear at an opposite end thereof;
   a fourth gear mounted to one end of a hollow drive shaft, the fourth gear and the hollow drive shaft rotating about the first rotational axis, the fourth gear being meshed with the third gear of the hollow, cylindrical shaft, the hollow drive shaft having a cylindrical end portion at an opposite end thereof;
   the output shaft rotating about the first rotational axis and having a flange portion attached thereto;
   a sprag clutch having an input side mounted to the cylindrical end portion of the hollow drive shaft and an output side mounted to the flange portion of the output shaft;
   a clutch attached to an end portion of input shaft and to the output shaft; and
   means for coupling and uncoupling the input shaft with the output shaft whereby the transmission operates in first or second modes.

2. The gear arrangement as recited in claim 1, wherein the first mode of operation results in a rotating speed ratio $R_1$ of 1 to 1 between the input shaft and the output shaft and the second mode of operation results in the rotating speed reduction ratio range of $4.00 > R_2 > 1.50$ between the input shaft and the output shaft.

3. The gear arrangement as recited in claim 2, wherein the second mode of operation results in the rotating speed reduction ratio range of 2 to 1 between the input shaft and the output shaft.

4. The gear arrangement as recited in claim 2, wherein the means for coupling the input shaft with the output shaft causes the rotational speed of the output shaft to be the same as the rotational speed of the input shaft (i.e. ratio 1:1) is the clutch.

5. The gear arrangement as recited in claim 4, wherein the clutch is a multi-plate clutch having first spaced clutch plates driven by an end portion of the input shaft and second spaced clutch plates driving the output shaft and interspersed between the first spaced clutch plates.

6. The gear arrangement as recited in claim 4, further including a clutch actuator means to engage or disengage the first and second interspersed clutch plates whereby if the multi-plate clutch is engaged the rotational speed of the output shaft is at a first speed which is the same as that of the input shaft and if the clutch is disengaged the rotational speed of the output shaft is at a speed that is less than that of the input shaft.

7. The gear arrangement as recited in claim 5, wherein the means for coupling the input shaft with the output shaft to cause the rotational speed of the output shaft to be the same as the rotational speed of the input shaft whereby the transmission operates in first mode is the multi-plate clutch.

8. The gear arrangement as recited in claim 5, wherein the means for coupling the input shaft with the output shaft to cause the rotational speed of the output shaft to be less than the rotational speed of the input shaft whereby the transmission operates in second mode is the sprag clutch.

9. The gear arrangement as recited in claim 1, wherein the first gear has external teeth adapted to engage internal teeth of the second gear and third gear has external teeth adapted to engage internal teeth of fourth gear.

10. The gear arrangement as recited in claim 7, wherein the relationship between the output rotational speed and the input rotational speed for the second mode of operation is given by the equation $$\text{Output speed} = \text{Input speed} \times \left(\frac{N_{14}}{N_{30}}\right) \times \left(\frac{N_{34}}{N_{18}}\right)$$

where $N_{14}$ is equal to the number of teeth on first gear, $N_{30}$ is equal to the number of teeth on the second gear, $N_{34}$ is equal to the number of teeth on the third gear, and $N_{18}$ is equal to the number of teeth on the fourth gear.

11. The gear arrangement as recited in claim 1, wherein the input shaft is driven by a device from which it receives rotational power.

12. The gear arrangement as recited in claim 1, wherein the first input shaft of the transmission is serially connected to the output shaft of a second gear arrangement for transmitting torque from a second input shaft to the first input shaft, the second gear arrangement comprises:
   the second input shaft rotating about the first rotational axis and having a fifth gear coupled thereto;
   an elongated, hollow, cylindrical shaft rotating about the second rotational axis that is offset from the first rotational axis, the hollow cylindrical shaft having a sixth gear at one end thereof which engages the fifth gear and a seventh gear at an opposite end thereof; and
   an eighth gear mounted to the input shaft of the transmission.

13. The gear arrangement as recited in claim 11, wherein the overall output ratio of two serially connected gear arrangements is the product of the two in-series ratios, $R_1$, $R_2$.

14. The gear arrangement as recited in claim 1, wherein the transmission is a rotorcraft transmission of a light weight configuration with reduced parts.

15. The method of transmitting torque from an input shaft to an output shaft, comprising:
- rotating the input shaft having a first gear coupled thereto about a first rotational axis;
- rotating an elongated, hollow, cylindrical shaft about a second rotational axis that is offset from the first rotational axis, the hollow cylindrical shaft having a second gear at one end thereof which meshes with the first gear and a third gear at an opposite end thereof;
- rotating a fourth gear mounted to one end of a hollow drive shaft with a cylindrical end portion at an opposite end thereof about the first rotational axis whereby the fourth gear meshes with the third gear of the hollow, cylindrical shaft;
- rotating the output shaft with a flange portion attached thereto about the first rotational axis;
- mounting an input side of a sprag clutch to the cylindrical end portion of the hollow drive shaft and an output side of the sprag clutch to the flange portion of the output shaft;
- attaching a clutch to an end portion of input shaft and to the output shaft; and
- coupling the input shaft with the output shaft whereby the transmission operates in either a first or a second mode.

16. The method as recited in claim 14, including the steps of:
- operating in the first mode of operation resulting in a rotating speed ratio $R_1$ of 1 to 1 between the input shaft and the output shaft; and
- operating in the second mode of operation resulting in the rotating speed ratio $R_2$ of and the second mode of operation results in the rotating speed reduction ratio range of $4.00 > R_2 > 1.50$ between the input shaft and the output shaft.

17. The method as recited in claim 14, further including the step of engaging or disengaging the clutch whereby when the clutch is engaged the rotational speed of the output shaft is at a first speed which is the same as that of the input shaft and when the clutch is disengaged the rotational speed of the output shaft is at a speed that is different than that of the input shaft.

18. The method of claim 16, including the step of coupling the input shaft with the output shaft to cause the transmission to operates in the first mode with the rotational speed of the output shaft the same as the rotational speed of the input shaft is with the multi-plate clutch.

19. The method of claim 14, including the step of connecting the input shaft to a device that transmits rotational power.

20. The method of claim 14, including the step of serially connected a plurality of gear arrangements with the output shaft of a second gear arrangement transmitting torque from a second input shaft to the first input shaft of a first gear arrangement comprising the steps of:
- rotating the second input shaft having a fifth gear coupled thereto about the first rotational axis;
- rotating an elongated, hollow, cylindrical shaft about the second rotational axis that is offset from the first rotational axis, the hollow cylindrical shaft having a sixth gear at one end thereof which meshes with the fifth gear and a seventh gear at an opposite end thereof; and
- mounting an eighth gear to the input shaft of the first gear arrangement.

21. The method of claim 19 including the step of taking the product of the two in-series ratios, $R_1$, $R_2$ to determine the overall output ratio of the two serially connected gear arrangements.

* * * * *